US 6,719,509 B1

(12) United States Patent
Huang et al.

(10) Patent No.: US 6,719,509 B1
(45) Date of Patent: Apr. 13, 2004

(54) EXPANSION SCREW

(75) Inventors: Pan-Ching Huang, Changhua (TW); Chih-Tsung Chen, Changhua (TW)

(73) Assignee: Joker Industrial Co., Ltd., Changhua (TW)

( * ) Notice: Subject to any disclaimer, the term of this patent is extended or adjusted under 35 U.S.C. 154(b) by 0 days.

(21) Appl. No.: 10/263,748

(22) Filed: Oct. 4, 2002

(51) Int. Cl.[7] ................................................ F16B 13/04
(52) U.S. Cl. .............................. 411/32; 411/38; 411/61
(58) Field of Search ............................. 411/32, 33, 34, 411/36, 38, 55, 61

(56) References Cited

U.S. PATENT DOCUMENTS

| | | | | |
|---|---|---|---|---|
| 4,657,456 A | * | 4/1987 | Anquetin | 411/61 X |
| 4,986,710 A | * | 1/1991 | Kovarik | 411/38 |
| 5,018,919 A | * | 5/1991 | Stephan | 411/33 |
| 5,725,341 A | * | 3/1998 | Hofmeister | 411/32 |

* cited by examiner

*Primary Examiner*—Neill Wilson
(74) *Attorney, Agent, or Firm*—Rosenberg, Klein & Lee

(57) ABSTRACT

An improved expansion screw and particularly an expansion screw for securely anchoring on various types of solid walls and hollow walls mainly includes a bolt and a nail tube. The nail tube has a front end fastened to a nut, a middle portion formed at least one expansion section which has carved slots formed thereon in an annular manner, and at least one ⊓-shaped slot formed annularly between the nut and the expansion section. Each ⊓-shaped slot has an expansion flap located therein. Every two neighboring ⊓-shaped slots are bridged by a longitudinal connection strip to form a bend section. When the bolt nut at the front end of the bolt is turned and driven to generate an inward compression, the expansion flap is forced to extend outwards and overlap with the annular ring at the front end of the nail tube, and the longitudinal connection strip is bent outwards on the bend section to form a double compression on the inner side of a construction hole in a wall to form a secured coupling. The multiple expansion section structure thus formed enables the invention be used in a wide variety of solid or hollow walls to form a secured fastening to minimize construction failure.

7 Claims, 12 Drawing Sheets

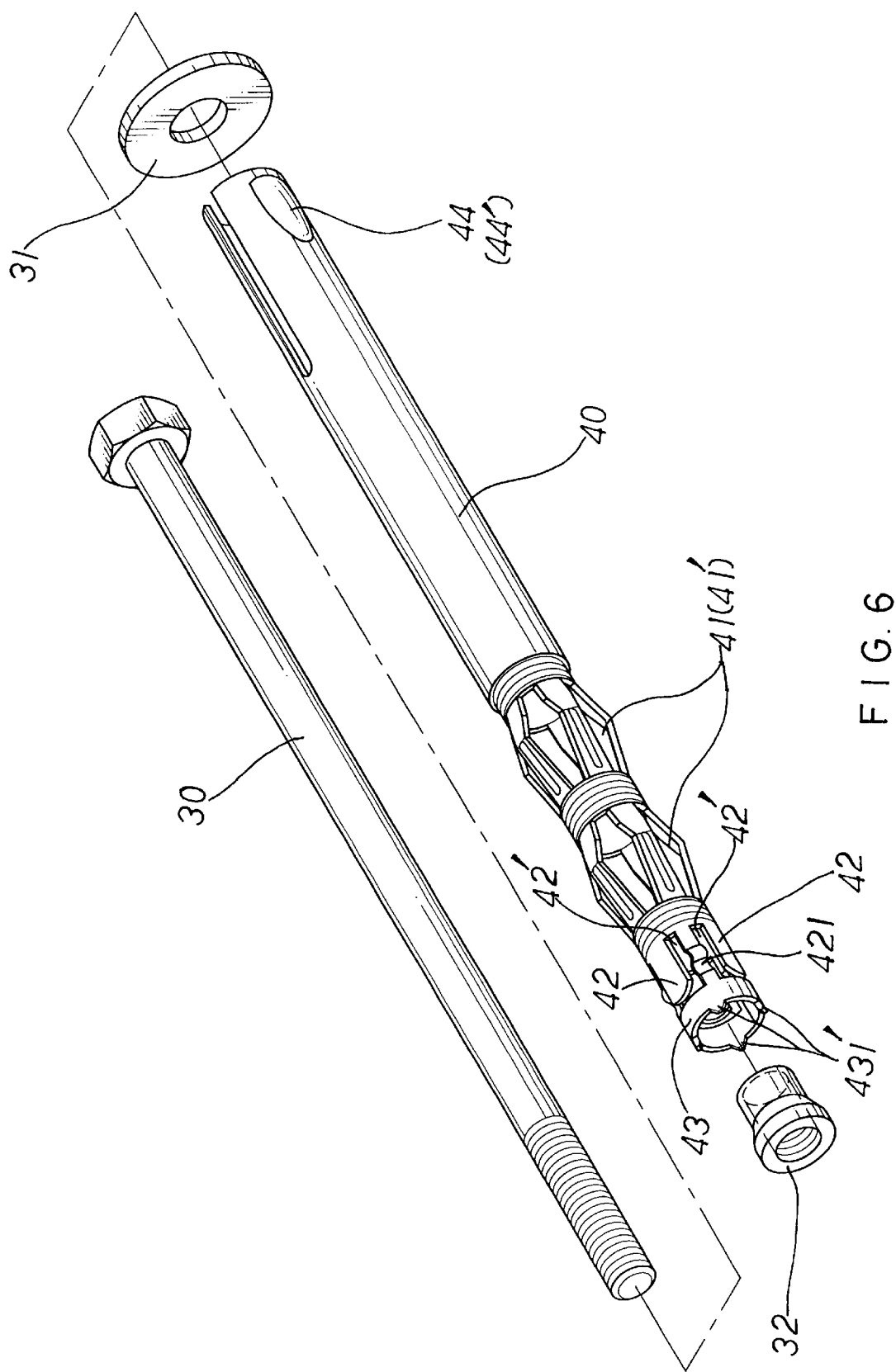
F I G. 6

EXPANSION SCREW

BACKGROUND OF THE INVENTION

1. Field of the Invention

The invention relates to an improved expansion screw and particularly an expansion screw for securely anchoring on a solid wall or a hollow wall.

2. Description of the Prior Art

There are a wide variety of expansion screws known in the art. In general, they can be grouped in two types as shown in FIGS. 1 and 2. In FIG. 1, the expansion screw 10 mainly includes a bolt 11 coupling with a washer 12, a nail tube 13 and a compression cone 14. The nail tube 13 has a front section formed an expansion section 131 to couple with the smaller end of the compression cone 14 so that when that expansion screw 10 is inserted into a construction hole 21 of a solid wall 20 (as shown in FIG. 3) the bolt 11 may be turned and tightened to pull the compression cone 14 into the nail tube 13 and force the expansion section 131 to expand outwards to squeeze the inner wall of the construction hole 21 to form anchoring. Then the bolt 11 may be used to hang or support articles. Such type of expansion screw 10 generally is suitable only for solid walls, but is not desirable for brick walls that have cavities inside.

FIG. 2 illustrates another type of conventional expansion screw 10' which includes a bolt 11' coupling with a washer 12' and a nail tube 13'. The nail tube 13' has a front end fastened to a nut 14' to engage with the bolt 11'. The front section of the nail tube 13' forms an expansion section 131' which has carved slots formed thereon in an annular manner. When the expansion screw 10' is inserted into a construction hole 21' of a hollow wall 20', the expansion section 131' may be expanded to a greater degree than the expansion screw 10 mentioned above. However, it is still difficult to control the expansion section 131' to move away from the hollow portion 210' of the wall 20'. It could happen that the extended expansion section 131' be located in the hollow portion 210' as shown in FIG. 4 and result in not secured coupling with the inner wall of the construction hole 21'. In practical constructions, it is often difficult to accurately determine whether the interior of a wall is solid or hollow, hence to nail the expansion screw into a wall often cause construction problems. How to resolve the problems occurred to the conventional expansion screws and to design an improved expansion screw that is suitable for solid walls and hollow walls thereby to effectively overcome the troubles in construction is the goal of the present invention.

SUMMARY OF THE INVENTION

The primary object of the invention is to provide an improved expansion screw that is applicable to various types of construction holes formed on a wide variety of solid walls and hollow walls.

Another object of the invention is provide an improved expansion screw that has a plurality of expansion flaps on an expansion section located on the front end of the nail tube to form a double overlap and to generate a double squeeze in the construction hole to achieve a secured fastening.

A further object of the invention is provide an improved expansion screw that has a plurality of expansion sections on the nail tube so that at least one expansion section may be extended to form a tight coupling with the interior structure of the wall to enhance success probability of construction.

In order to achieve the foregoing objects, the invention includes a bolt coupled with a washer and a nail tube which has a front end fastened to a nut. The nail tube has carved slots formed on the middle portion to form at least one expansion section. Between the expansion section and the nut, the nail tube has a plurality of Π-shaped slots formed thereon. On an inner side of each Π-shaped slot, there is an expansion flap. Each the Π-shaped slot borders a longitudinal connection strip to form a bend section. The nail tube beyond the connection strip forms an annular ring with an outer edge formed a plurality of jutting lugs for soldering a nut. The expansion screw thus constructed has at least one expansion section to generate expansion on a plurality of sections.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 6 is an exploded view of the invention.

DESCRIPTION OF THE PREFERRED EMBODIMENTS

Figure 1:
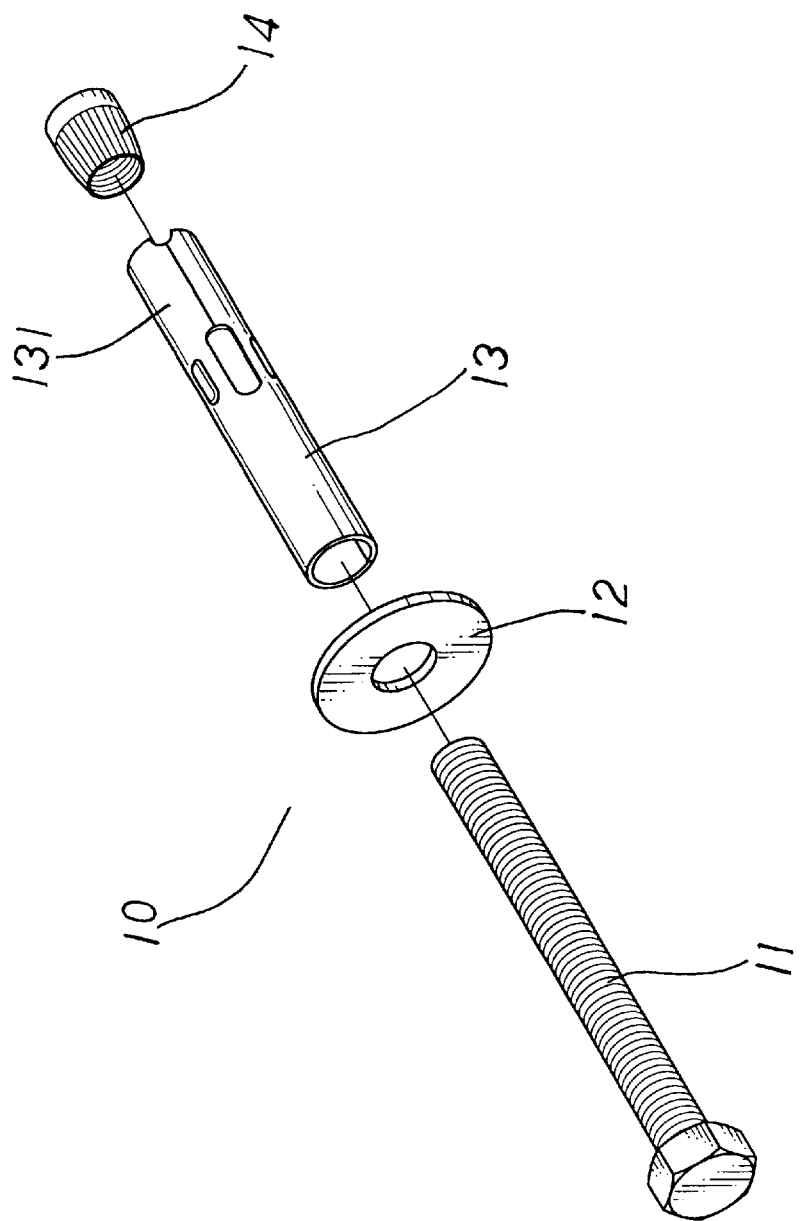
FIG. 1 is an exploded view of a conventional expansion screw.
Figure 2:
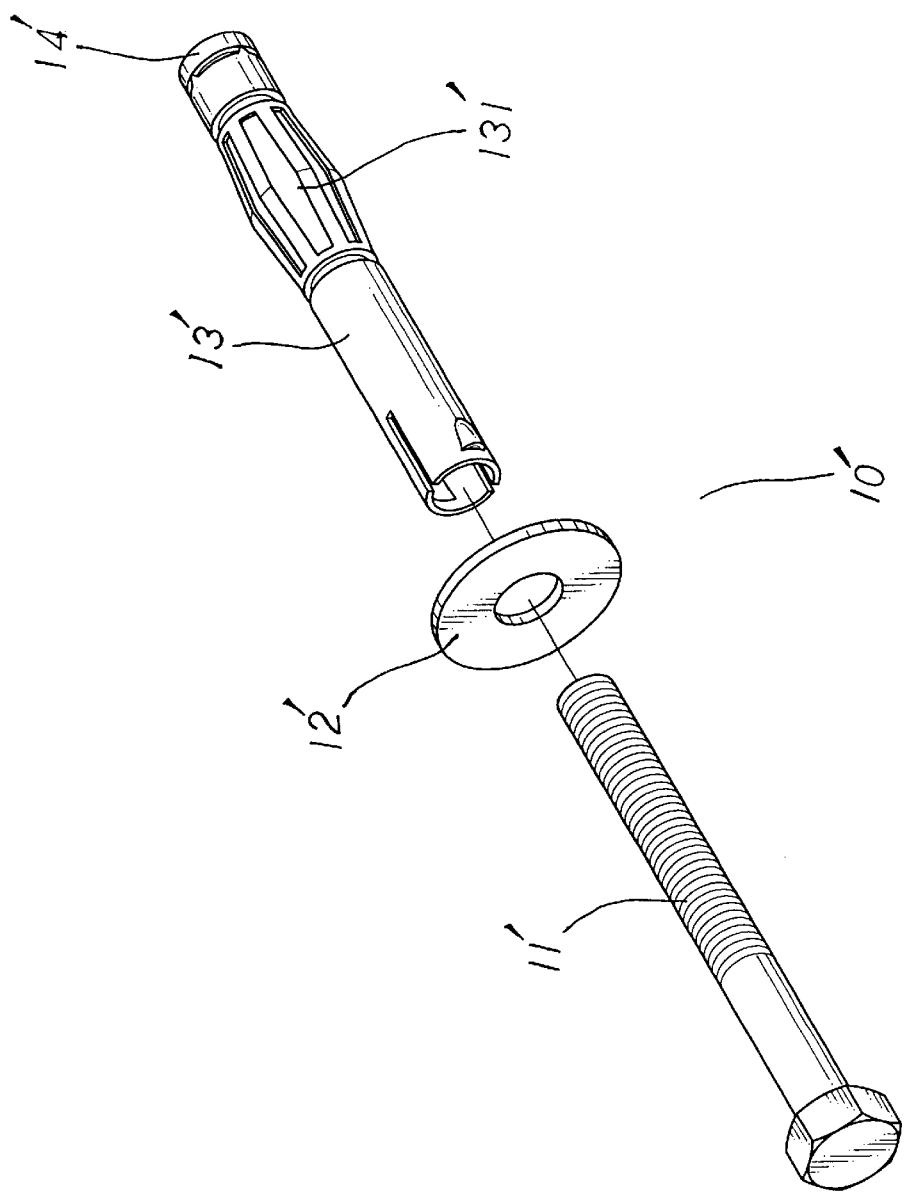
FIG. 2 is an exploded view of another type of conventional expansion screw.
Figure 3:
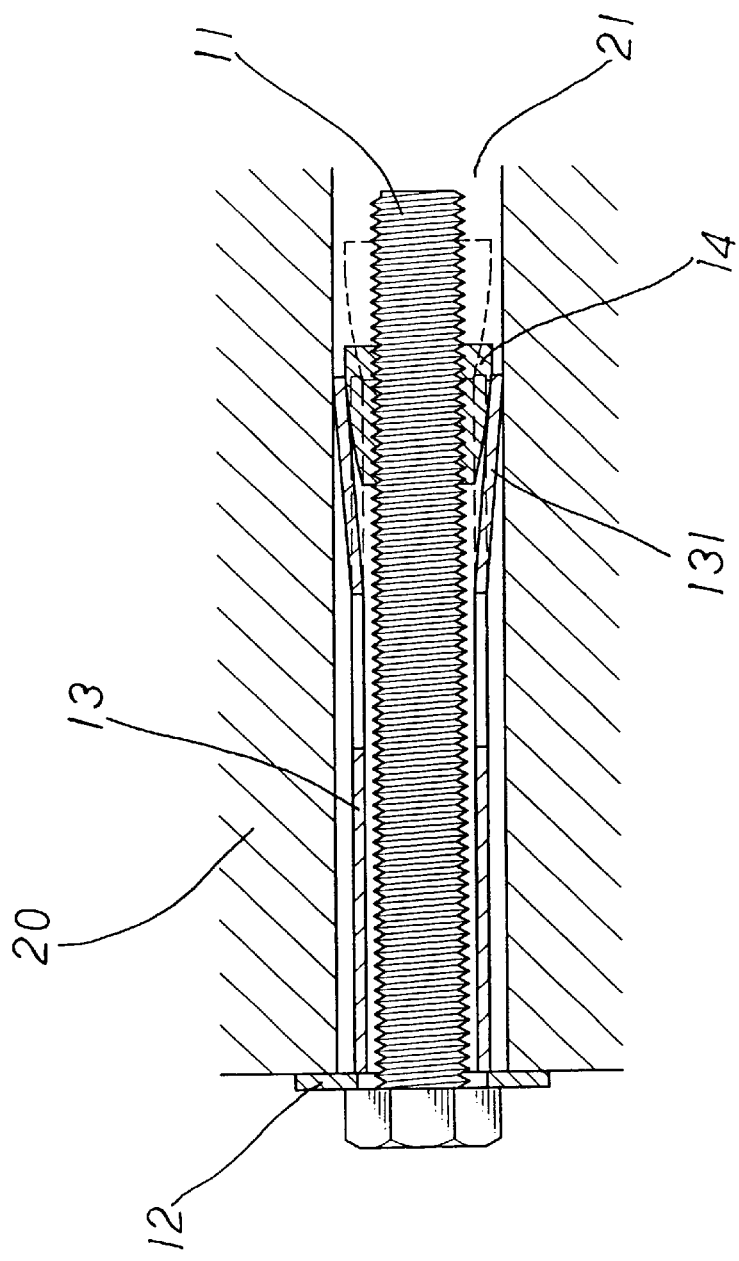
FIG. 3 is a sectional view of a conventional expansion screw disposed in a solid wall.
Figure 4:
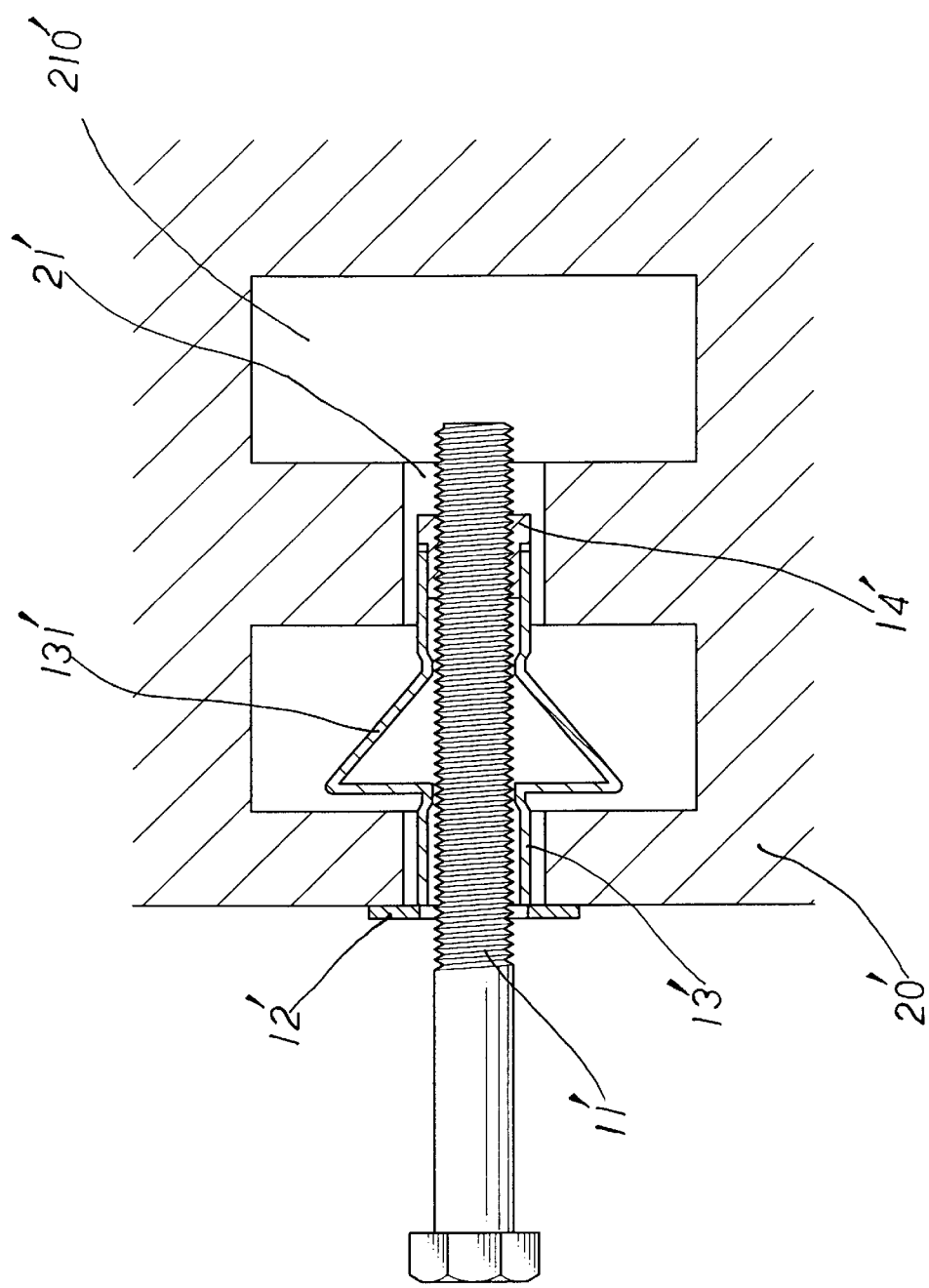
FIG. 4 is a sectional view of another type of conventional expansion screw disposed in a hollow wall.
Figure 5:
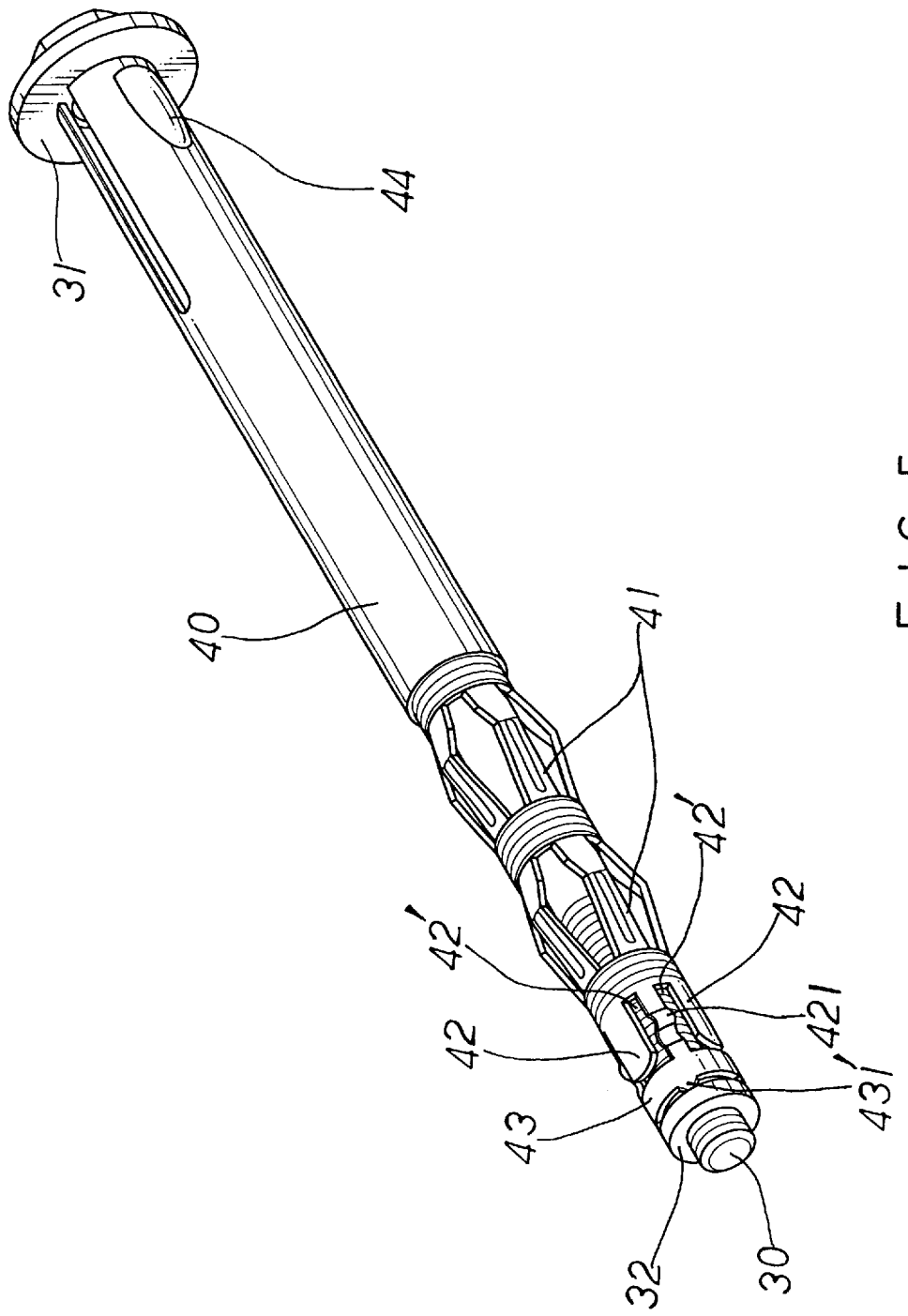
FIG. 5 is a perspective view of the invention.

Referring to FIGS. 5 and 6, the invention mainly includes a bolt 30 which has a neck section coupling with a washer 31 and a nail tube 40. The nail tube 40 has a front end fastened to a nut 32 for engaging with the bolt 30.

Figure 7:
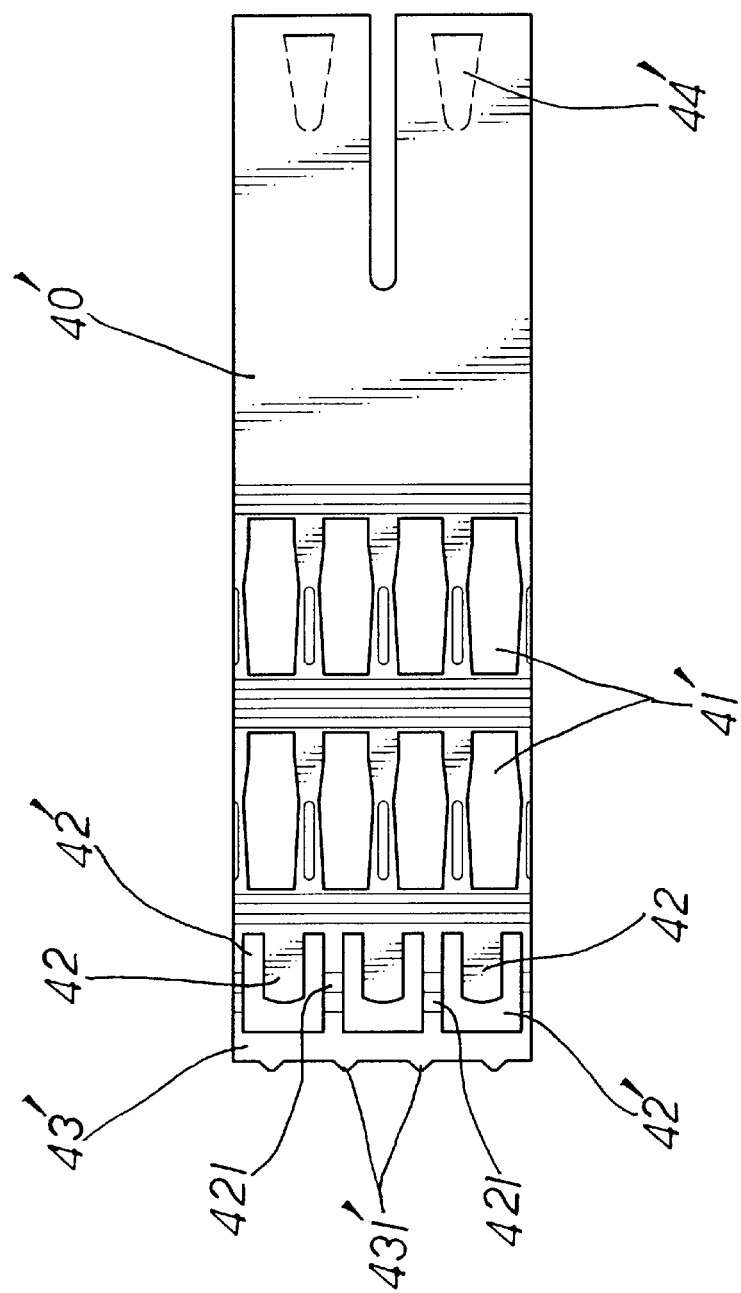
FIG. 7 is a flattened view of the nail tube of the invention.

Refer to FIG. 7 for a flattened view of the nail tube 40. The nail tube 40 may be flattened to form an extended blade 40' which has at least one carved slot 41' formed at one end and spaced from each other. On an upper side of the extended blade, there is at least one Π-shaped slot 42' spaced from each other. Each Π-shaped slot 42' has an inner side with an expansion flap 42 formed thereon. There is an outer strip 43' formed on the outer side of the Π-shaped slot 42'. The outer strip 43' further has a plurality of jutting lugs 431' formed on the outer edge thereof. On another end of the extended blade 40', there is at least one jutting flap 44' formed by stamping.

Referring to FIGS. 6 and 7, the nail tube 40 is formed by rolling the extended blade 40' longitudinally and has the spaced carved slots 41' formed at least one expansion section 41. The Π-shaped slot 42' on the upper side has the expansion flap 42 located therein and extended outwards. Every two neighboring ⊓-shaped slots 42' are bridged by a longitudinal connection strip to form a bend section 421. The outer strip 43' on the outer side of the bend section 421 forms an annular ring 43 with the jutting lugs 431' formed on the outer edge thereof. The jutting flap 44' on another end is extended outwards to form an anchor bump 44. The jutting lugs 431' on the outer edge of the annular ring 43 is fastened to a nut 32 by soldering for engaging with the front end of the bolt 30 to form a completed expansion screw shown in FIG. 5.

Figure 8:
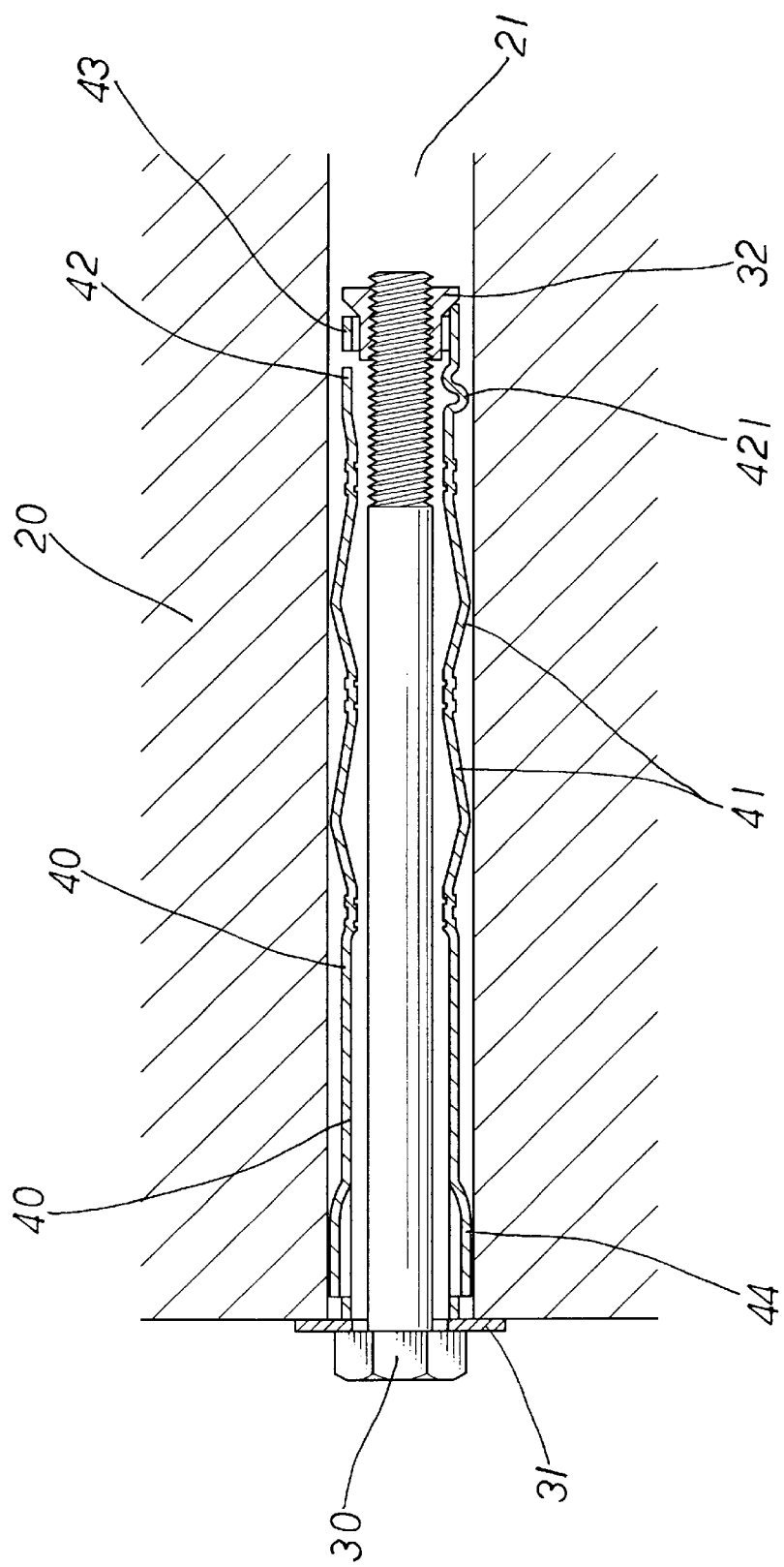
FIG. 8 is a schematic view of the invention disposed in a solid wall before being pulled forwards.
Figure 9:
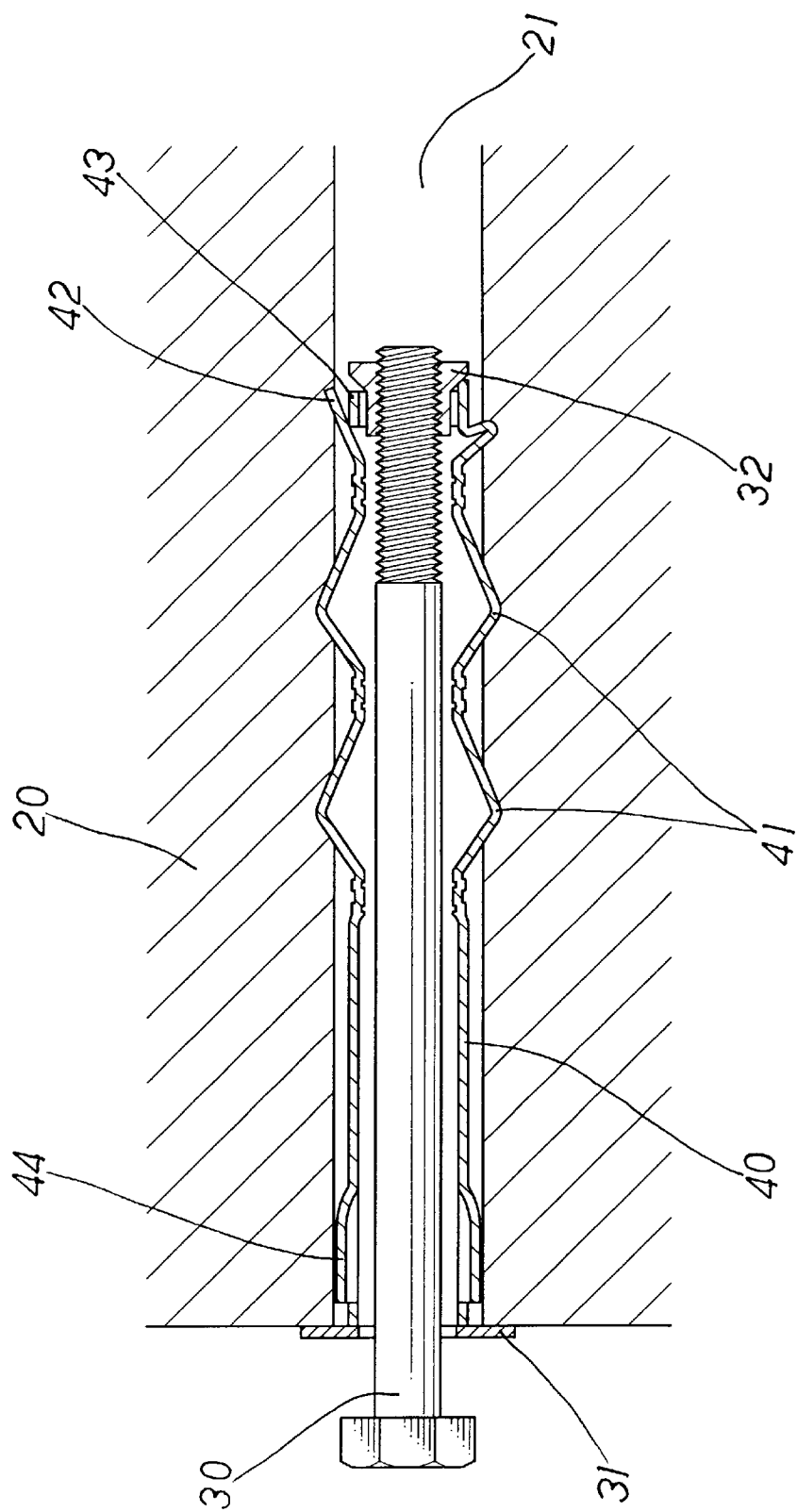
FIG. 9 is a schematic view of the invention disposed in a solid wall after being pulled forwards.

Refer to FIGS. 8 and 9 for an embodiment of the invention nailed in a solid wall. When the expansion screw of the invention is inserted into a construction hole 21 on a solid wall 20 through the end fastened to the nut 32, the anchor bump 44 located at the outer end of the nail tube 40 is located on the outer section of the construction hole 21 by force so that the nail tube 40 is anchored and stationary. Then the bolt nut of bolt 30 located on the outer side of the solid wall 20 may be turned by means of a tool to pull the nut 32 in the axial direction to compress the expansion section 41. The longitudinal connection strip between the carved slots 41' is compressed axially and forces the expansion section 41 to expand outwards to form an anchoring. Meanwhile, the nut 32 is pulled axially to compress the inner side of the annular ring 43 and force the longitudinal connection strip between the ⊓-shaped carved slots 42' to bend outwards on the bend section 421. The expansion flap 42 is also being pushed and extended outwards to augment the expansion and to further increase the anchoring effect. As a result, the expansion screw forms multiple forced couplings in the construction hole 21 of the solid wall 20 (as shown in FIG. 9).

Figure 10:
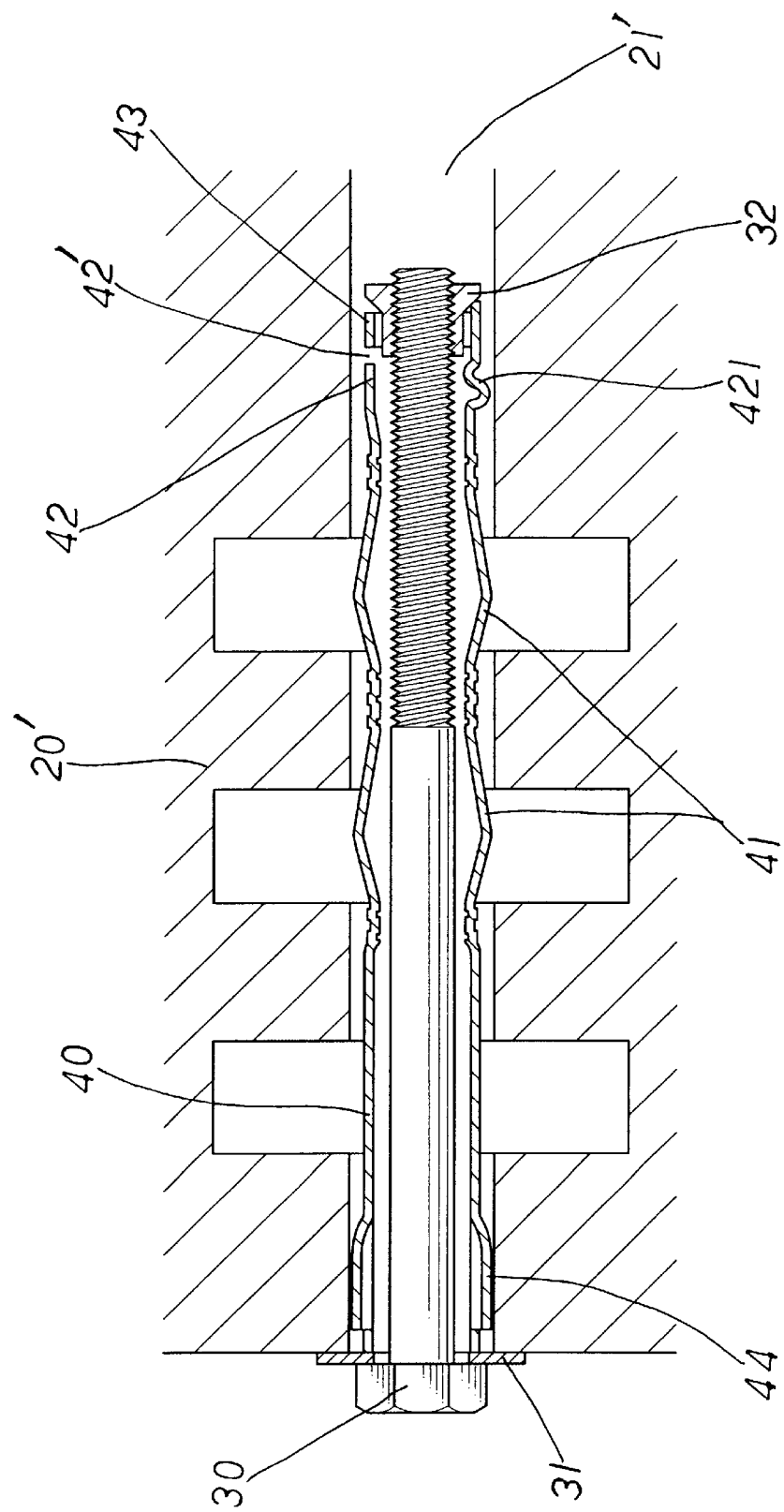
FIG. 10 is a schematic view of the invention disposed in a hollow wall before being pulled forwards.
Figure 11:
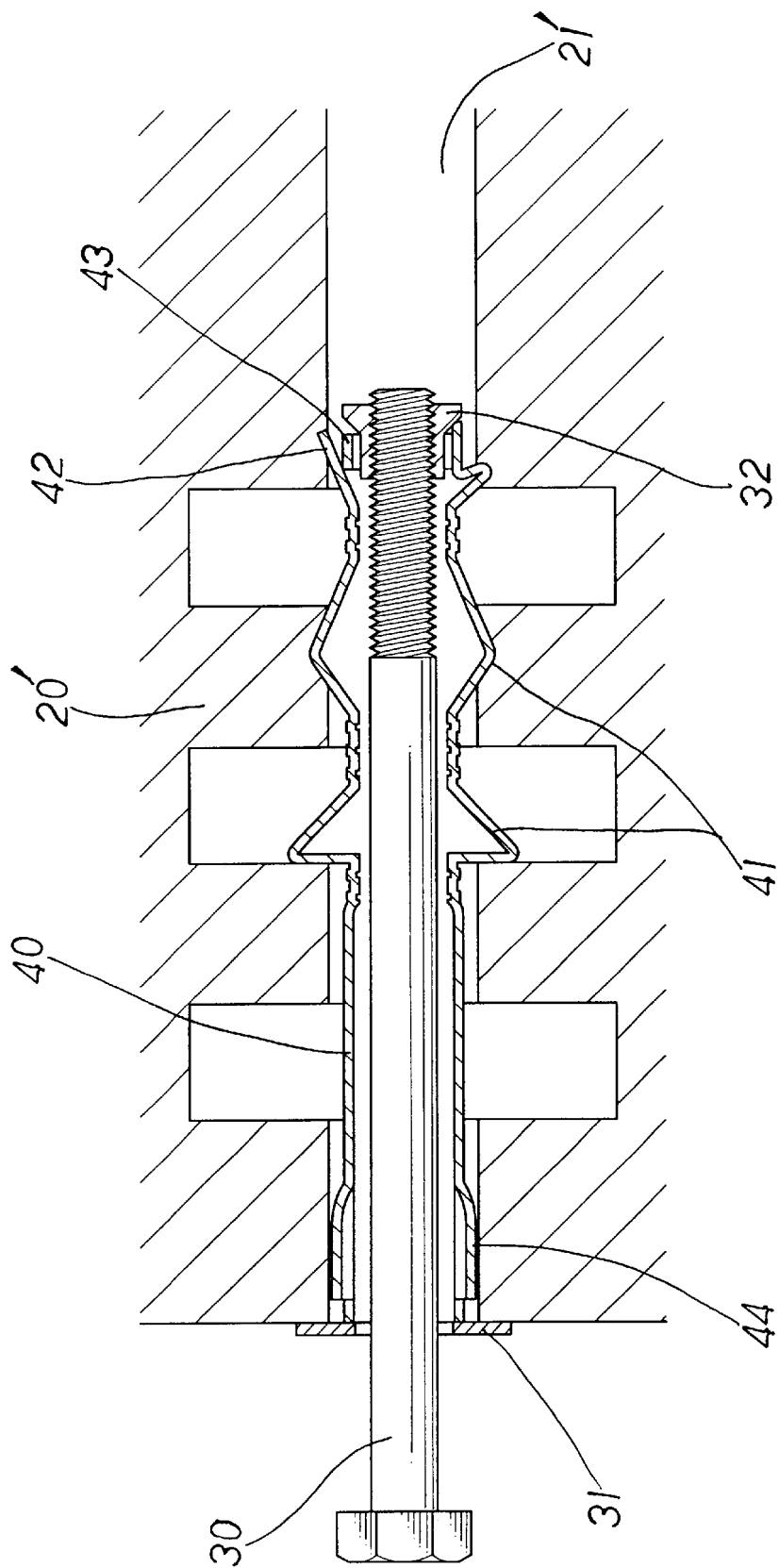
FIG. 11 is a schematic view of the invention disposed in a hollow wall after being pulled forwards.

Refer to FIGS. 10 and 11 for an embodiment of the invention nailed in a hollow wall 20'. When the expansion screw of the invention is inserted into a construction hole 21' on the hollow wall 20' through the end fastened to the nut 32, the anchor bump 44 located at the outer end of the nail tube 40 is located on the outer section of the construction hole 21 by force so that the nail tube 40 is anchored and stationary. Then the bolt nut of bolt 30 located on the outer side of the solid wall 20 may be turned by means of a tool to pull the nut 32 in the axial direction to compress the expansion section 41. The longitudinal connection strip between the carved slots 41' of the expansion section 41 is compressed and expanded outwards to form multiple section forced couplings. Meanwhile, the nut 32 is pulled axially to compress the inner side of the annular ring 43 and force the longitudinal connection strip between the ⊓-shaped carved slots 42' to bend outwards on the bend section 421. The expansion flap 42 is also being pushed and extended outwards. Hence as long as either one expansion section 41 or the expansion flap 42 at the front end couples with a solid section of the construction hole 21' of the hollow wall 20', the expansion screw can be anchored securely on the wall (as shown in FIG. 11).

Figure 12:
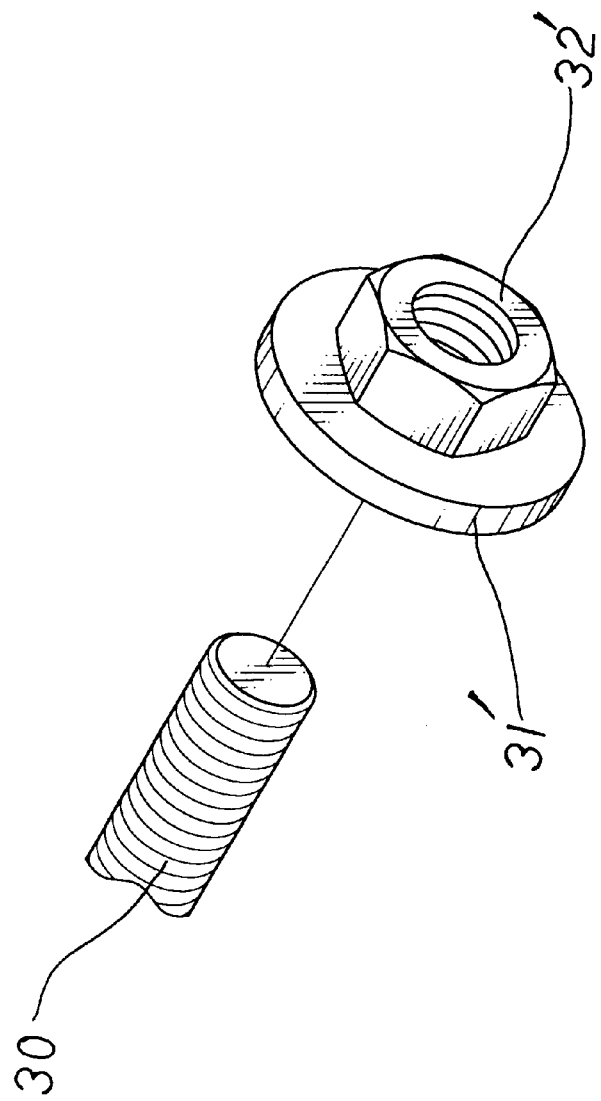
FIG. 12 is a schematic view of an embodiment of the bolt and the washer nut assembly of the invention.

Furthermore, referring to FIG. 12, the outer bolt nut end of the bolt 30 may be coupled with a washer 31. Or a hexagon nut 32' may be coupled with a washer 31' to engage with the bolt 30 that has no bolt nut formed thereon to replace the single bolt and washer assembly.

By means of the construction and embodiment set forth above, the expansion screw of the invention has longitudinal connection strips located between the ⊓-shaped slots at the front section of the nail tube to receive axial compression and be bent and expanded outwards to form forced coupling with the solid section inside the construction hole. Meanwhile the expansion flap in the ⊓-shaped slot is expanded outside to augment the expansion section already located in the wall to form forced coupling on multiple points. Thus the expansion screw may be anchored easily and securely in the various types of walls without causing construction defects.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:

1. An expansion screw, comprising:
    (a) a bolt with a threaded distal end;
    (b) a nut having a substantially cylindrical shape and defining a threaded central bore adapted to receive said threaded distal end of said bolt; and,
    (c) a nail tube having
        an annular ring formed at a distal end and fastenable to said nut;
        a proximal end with a substantially cylindrical central channel adapted to slidingly receive said bolt;
        a middle portion interposed between said proximal and distal ends and having an at least one expansion section each with a plurality of carved longitudinal slots formed therein and regularly spaced each from the other in a circumferential manner, said carved longitudinal slots defining between adjacent carved longitudinal slots a plurality of radially deformable slot sections; and,
        at least a pair of inverted U-shaped slots formed proximal to said annular ring and regularly spaced from each other, with each inverted U-shaped slot defining an expansion flap that is radially displaceable and located on an inner side thereof, wherein said bolt is threadedly engaged and axially displaced in said nail tube.

2. The expansion screw of claim 1, wherein adjacent inverted U-shaped slots are bridged by a connection strip to form a bend section having a distal side connected to said annular ring and a proximal side connected to said middle section.

3. The expansion screw of claim 2, wherein the annular ring of said nail tube has a plurality of latch lugs formed on an outer distal edge thereof for soldering to said nut.

4. The expansion screw of claim 1, wherein the nail tube has at least one anchor bump formed on an outer surface of a proximal end thereof.

5. The expansion screw of claim 1, wherein each inverted U-shaped slot borders a longitudinal connection strip to form a radially deformable bend section.

6. The expansion screw of claim 1, wherein the bolt has a threaded proximal neck section coupled with a washer.

7. The expansion screw of claim 6, wherein said bolt has a bolt head which is a hexagonal nut coupling with a washer fixedly received on said threaded proximal neck section of said bolt.

* * * * *